United States Patent
Hirvonen

(10) Patent No.: US 9,114,688 B2
(45) Date of Patent: Aug. 25, 2015

(54) SLIDER UNIT FOR THE MOUNTING OF A MOVABLE ROOF ELEMENT OF A VEHICLE ROOF, AND VEHICLE ROOF

(75) Inventor: Mattias Hirvonen, München (DE)

(73) Assignee: WEBASTO SE, Stockdorf (DE)

( * ) Notice: Subject to any disclaimer, the term of this patent is extended or adjusted under 35 U.S.C. 154(b) by 71 days.

(21) Appl. No.: 14/117,345

(22) PCT Filed: May 18, 2012

(86) PCT No.: PCT/EP2012/059281
§ 371 (c)(1),
(2), (4) Date: Jan. 9, 2014

(87) PCT Pub. No.: WO2012/159995
PCT Pub. Date: Nov. 29, 2012

(65) Prior Publication Data
US 2015/0137562 A1 May 21, 2015

(30) Foreign Application Priority Data
May 20, 2011 (DE) .......................... 10 2011 102 718

(51) Int. Cl.
*B60J 7/04* (2006.01)
*B60J 7/00* (2006.01)
*B60R 13/02* (2006.01)

(52) U.S. Cl.
CPC ............. *B60J 7/003* (2013.01); *B60R 13/0206* (2013.01); *B60R 13/0231* (2013.01)

(58) Field of Classification Search
CPC ...... B60J 7/0007; B60J 7/0015; B60J 7/0023; B60J 7/003; B60J 7/0038
USPC .................................. 296/214, 216.01–224
See application file for complete search history.

(56) References Cited

U.S. PATENT DOCUMENTS

| 804,308 | A | | 11/1905 | Forsyth | |
|---|---|---|---|---|---|
| 5,101,540 | A | * | 4/1992 | Roof et al. ...................... | 24/458 |
| 5,144,725 | A | * | 9/1992 | Krauss ............................ | 24/625 |
| 2004/0068839 | A1 | | 4/2004 | Hock et al. | |

FOREIGN PATENT DOCUMENTS

| CN | 1246417 A | | 3/2000 | |
|---|---|---|---|---|
| DE | 2939992 | * | 10/1979 | ................ B60J 7/04 |
| DE | 102004057810 A1 | | 6/2006 | |

(Continued)

OTHER PUBLICATIONS

International Search Report PCT/EP2012/059281 with English language translation dated Jul. 26, 2012.

*Primary Examiner* — Dennis H Pedder
(74) *Attorney, Agent, or Firm* — Fitch, Evan, Tabin & Flannery LLP

(57) ABSTRACT

Slider unit for mounting a movable roof member to a vehicle roof. A sliding block has at least two sliding faces and a carrier member, which is designed for coupling to the movable roof member and for mechanical coupling to the sliding block. The carrier member has a first tab and a second tab which are arranged substantially centrally in the carrier member relative to a displacement direction (V) of the slider unit. The first tab is in engagement with a recess in the sliding block to fix its position in relation to the fixed part of the vehicle roof. The second tab engages with the recess of the sliding block and is designed in such a manner that the sliding block is pretensioned in relation to the vehicle-fixed part in the mounted state of the slider unit.

11 Claims, 5 Drawing Sheets

(56) References Cited

FOREIGN PATENT DOCUMENTS

| DE | 102007052605 B3 | 4/2009 |
| EP | 1 637376 A1 | 3/2006 |
| FR | 2466364 A1 | 4/1981 |
| FR | 2906188 A1 | 3/2008 |

* cited by examiner

SLIDER UNIT FOR THE MOUNTING OF A MOVABLE ROOF ELEMENT OF A VEHICLE ROOF, AND VEHICLE ROOF

CROSS REFERENCE TO RELATED APPLICATIONS

This application is a U.S. national phase application of International Application No. PCT/EP2012/059281, filed May 18, 2012, which claims benefit of the priority date of German Application 10 2011 102 718.5 filed May 20, 2011, which are hereby incorporated herein by reference in their entirety.

The invention relates to a slider unit for mounting a movable roof member of a vehicle roof according to the preamble of claim 1, and a vehicle roof.

Various movable roof members, such as sliding headliners with or without a glass element or roller blinds, particularly sun roller blinds, can be moved in relation to a vehicle-fixed section of the vehicle roof, preferably in a longitudinal vehicle direction, using a slider unit of this kind.

US 2004/0068839 A1 discloses a guide arrangement for a sliding roof of a vehicle. The guide arrangement comprises a guide rail and a sliding carriage which is displaceable in the guide rail. A spring interacts with the sliding carriage in such a manner that a brake member of the sliding carriage is pressed against a brake face of the guide rail.

FR 2 906 188 A1 discloses a covering device for a vehicle comprising a covering member which is displaceable between a retracted and an extended position. A pull bow has a block at each of its ends, which is arranged in a guide rail in each case.

U.S. Pat. No. 804,308 discloses a fixture device for a roller blind which is connected to a window frame. The fixture device has rollers and friction members which can be brought into contact with the window frame.

The problem addressed by the invention is that of creating a slider unit for mounting a movable roof member of a vehicle roof, and a vehicle roof, which is characterized by outstanding mechanical properties.

This problem is solved according to a first aspect of the invention by a slider unit according to claim 1.

One advantage of a slider unit of this kind is that the sliding block can be pretensioned in relation to the vehicle-fixed part of the vehicle roof and a secure fit of the sliding faces against the vehicle-fixed part of the vehicle roof is thereby possible. The two tabs perform different functions. The first tab can be designed to absorb large forces and guarantee a stable mounting in relation to the roof-fixed part, particularly a guide rail in other words. The second tab may produce a pretensioning of the sliding block in a Z direction of the motor vehicle, due to its spring action. The second tab presses the sliding block against the vehicle-fixed part during this, due to its spring action, so as to prevent rattling. The pretensioning may be generated upwards or downwards in alternative embodiments.

A further advantage of the slider unit according to the invention is that resistance to production tolerances, particularly of the sliding block, can be achieved. The central arrangement of the tabs relative to the displacement direction of the slider unit has the advantage that a symmetrical force deflection from the carrier member to the sliding block can take place.

In an advantageous embodiment, the tabs are arranged substantially centrally in the sliding block relative to the displacement direction of the slider unit. This has the advantage that a symmetrical transmission of force into the sliding block can take place.

In a further advantageous embodiment, the second tab is configured as a cutout of the first tab. Low material consumption for the tabs and a very high stability of the tabs can thereby be achieved.

In a further advantageous embodiment, the sliding block exhibits fins in the region of the sliding faces. This means that the sliding block can be resistant to twisting.

In a further advantageous embodiment, the fins are conical or spherical. This has the advantage that high stability of the sliding block and high resistance of the sliding block to twisting can be achieved.

In a further advantageous embodiment, the carrier member has carrier arms extending in the displacement direction of the slider unit, which arms are mechanically coupled at their ends to corresponding end sections of the sliding block. This has the advantage that pretensioning of the sliding block in relation to the vehicle-fixed part of the vehicle roof can be achieved transversely to the displacement direction of the slider unit.

In a further advantageous embodiment, the sliding block is formed in one piece. This has the advantage that the number of parts for the slider unit can be kept small.

In a further advantageous embodiment, the carrier member is formed in one piece. This has the advantage that the number of parts for the slider unit can be kept small.

In a further advantageous embodiment, the carrier member is made of a material comprising stainless steel. A simple design of the carrier member can thereby be achieved. Furthermore, the radii of curvature of the carrier member may be larger in design.

In a further advantageous embodiment, the carrier member is made of a material comprising spring steel. According to a second aspect of the invention, the problem is solved by a vehicle roof comprising a vehicle-fixed part, a movable roof member and a slider unit according to the first aspect of the invention.

The vehicle-fixed part is configured as a guide rail, in which the slider unit is displaceably mounted such that the movable roof member is displaceable in relation to the guide rail.

In an advantageous embodiment of the second aspect of the invention, the movable roof member is a sliding headliner which is designed either to close a roof opening in a closed position of the sliding headliner or to open it at least partially in further positions.

Further advantageous embodiments of the invention are indicated in the dependent claims.

The invention is explained in greater detail below with the help of exemplary embodiments. In the figures.

Members with the same structure or function are labeled using the same reference numbers across all the figures.

Figure 1:
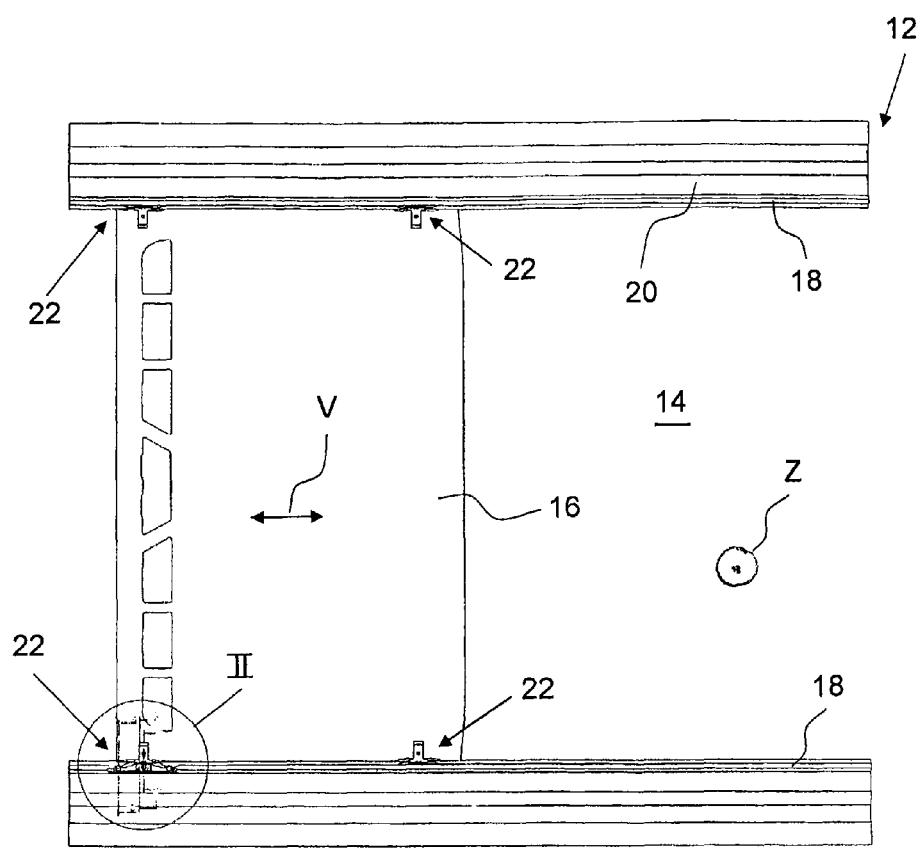
FIG. 1 shows a plan view of a vehicle roof of a motor vehicle.

FIG. 1 shows a vehicle roof 12 of a motor vehicle. The vehicle roof 12 is provided with a roof opening 14 which can either be closed or at least partially opened by means of a movable roof member 16. The movable roof member 16 may be designed as an internally or externally guided sliding headliner, for example. In further embodiments of the moving roof member 16, a roller blind, particularly a sun roller blind, can be arranged instead of the sliding headliner.

Figure 2:
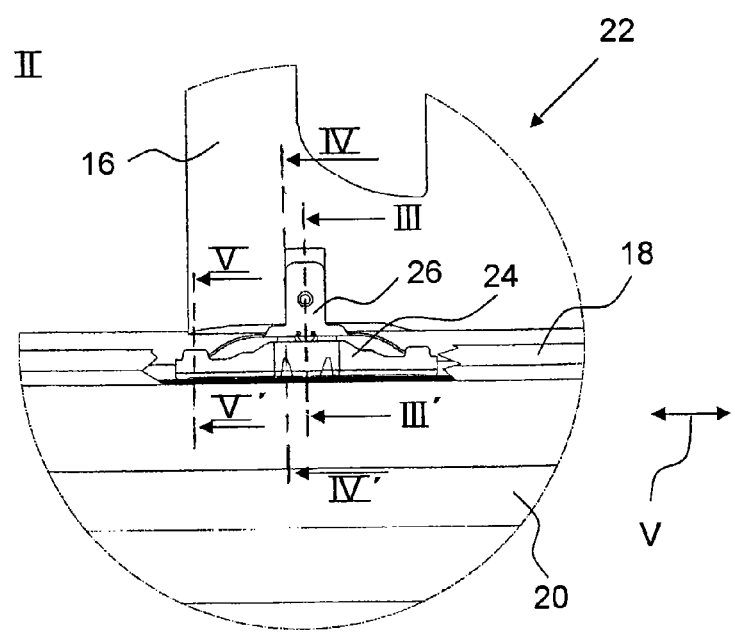
FIG. 2 shows a detail II of the vehicle roof in FIG. 1 with a slider unit.

A vehicle-fixed part 20 of the vehicle roof 12 which exhibits two guide rails 18 extending in the longitudinal direction of the vehicle, on which the movable roof member 16 is laterally guided, can be inferred from FIGS. 1 and 2. The guide rails 18 are configured as extruded aluminum sections, for example.

The vehicle roof 12 furthermore has a plurality of slider units 22. If the moving roof member 16 is a sliding headliner, for example, by displacing the slider units 22 in a displacement direction V depending on their position, it is possible for said sliding headliner either to close the roof opening 14 in a closed position of the sliding headliner or to open it at least partially in further positions.

Figure 3:
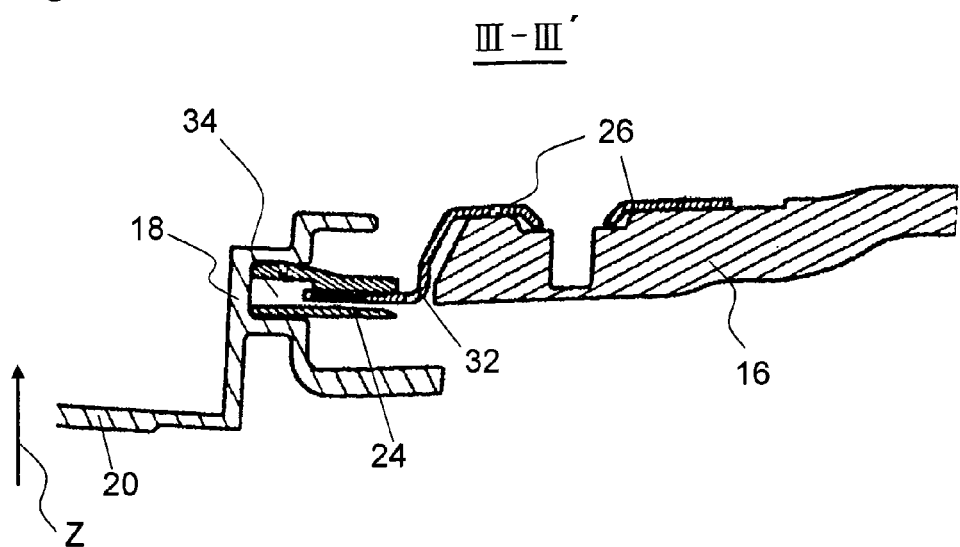
FIG. 3 shows a cross-section along the line III-III' in FIG. 2.
Figure 4:
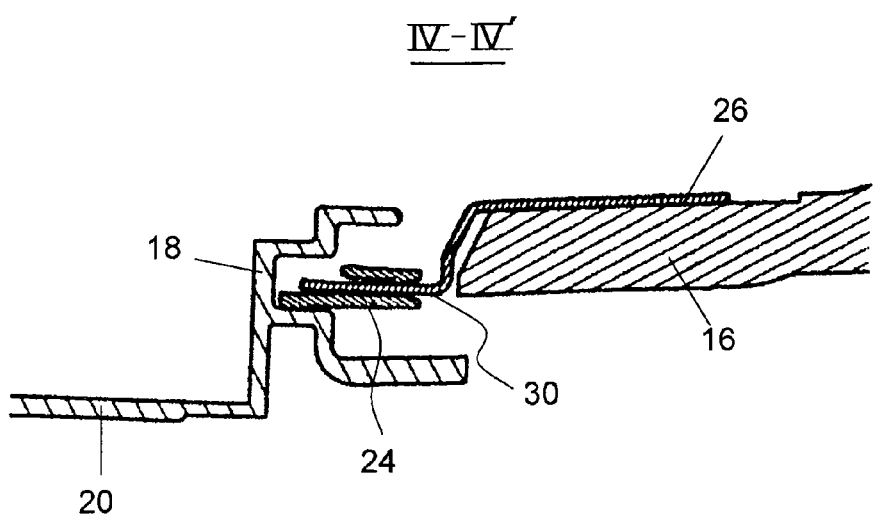
FIG. 4 shows a cross-section along the line IV-IV' in FIG. 2.
Figure 5:
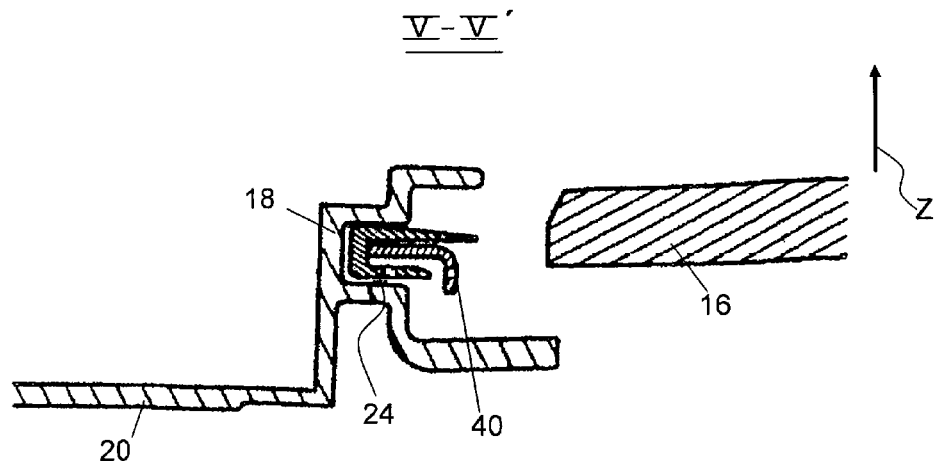
FIG. 5 shows a cross-section along the line V-V' in FIG. 2.
Figure 7:
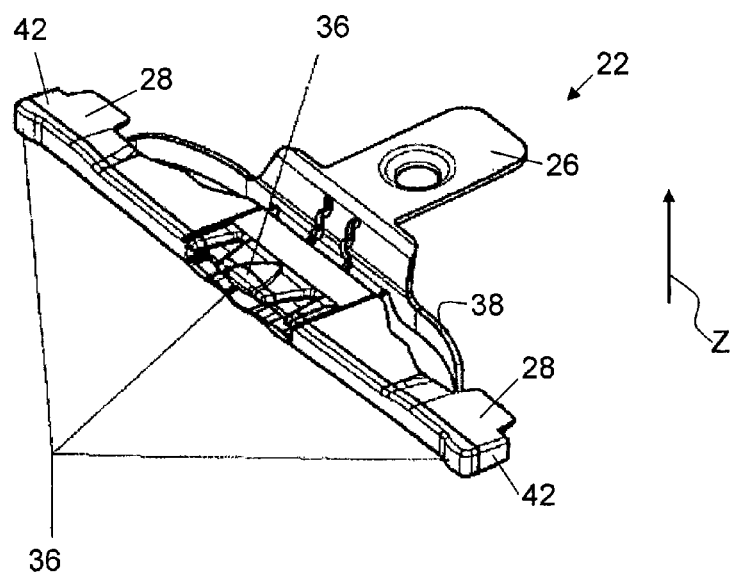
FIG. 7 shows a further perspective view of the slider unit.
Figure 8:
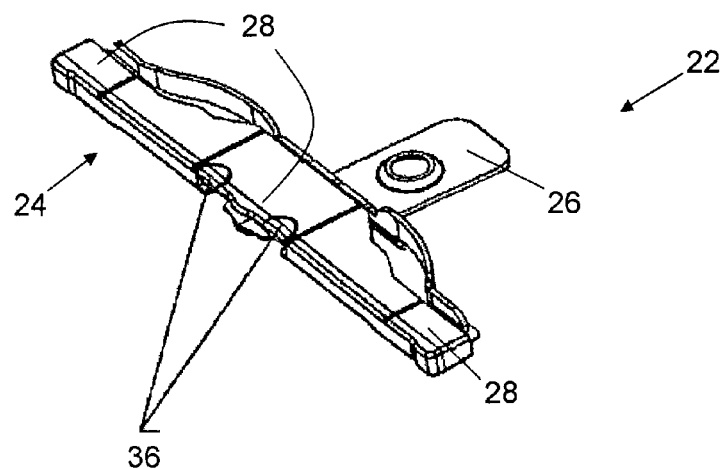
FIG. 8 shows a further perspective view of the slider unit.

The slider unit 22 has a sliding block 24 and a carrier member 26. The sliding block 24 is housed in the guide rail 18 of the vehicle-fixed part 20 of the vehicle roof 12. The sliding block 24 is preferably formed in one piece. The sliding block 24 has at least two sliding faces 28 which are in sliding contact with the guide rail 18 of the vehicle-fixed part 20 of the vehicle roof 12 (see FIGS. 3 and 5). The sliding faces 28 are preferably arranged on sides of the sliding block 24 facing away from one another (see FIGS. 7, 8). The carrier member 26 is firmly coupled to the movable roof member 16 of the vehicle roof 12. The carrier member 26 is preferably formed in one piece.

Through the one-piece design of the sliding block 24 and of the carrier member 26, the number of components in the slider unit 22 can be advantageously limited to two.

Figure 6:
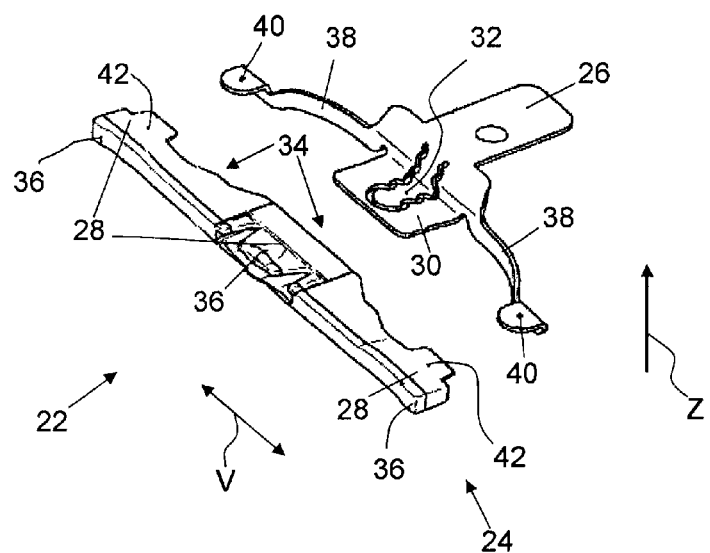
FIG. 6 shows a perspective view of the slider unit.

As can be seen particularly clearly in FIG. 6, the carrier member 26 has a first tab 30 and a second tab 32. The tabs 30, 32 are arranged substantially transversely to the displacement direction V of the slider unit 22. A recess 34 is formed in the sliding block 24, with which the first tab 30 and the second tab 32 engage. The first tab 30 interacts with the second tab 32 in such a manner that the sliding block 24 is mechanically pretensioned, such that the at least two sliding faces 28 come into sliding contact with the vehicle-fixed part 20 of the vehicle roof. It can thereby be achieved that the sliding block 24 is pretensioned in a sustained manner, so that movement of the sliding block 24 in a Z direction of the motor vehicle, as depicted in the figures, and therefore rattling of the slider unit 22 in the guide rail 18, can be avoided.

The tabs 30, 32 are arranged substantially centrally in the carrier member 26 relative to the displacement direction V of the slider unit 22, in other words in the longitudinal vehicle direction. In the embodiment depicted here, the tabs 30, 32 are also arranged substantially centrally in the sliding block 24 relative to the displacement direction V of the slider unit 22. A high symmetry of the slider unit 22 can thereby be achieved and the stiffness and pretensioning of the slider in the Z direction of the motor vehicle depicted in the figures and also the pretensioning transversely to the displacement direction V of the slider unit 22 can be set independently of one another. The first tab 30, in particular, can determine the position of the slider unit 22 in the Z direction of the motor vehicle depicted in the figures and also absorb the forces in the Z direction of the motor vehicle.

In the embodiment shown here, the second tab 32 is designed as a cutout of the first tab 30 (see FIG. 6, in particular). A smaller material consumption for the tabs 30, 32 can thereby be achieved and the tabs 30, 32 can be particularly stable in design.

Fins 36 are mounted on the sliding faces 28 of the sliding block 24. The fins 36 are particularly conical or spherical in design. The conical or spherical configuration of the fins 36 enables the slider unit 22 to be particularly resistant to twisting and therefore exhibit very small displacement force fluctuations.

The carrier member 26 has two carrier arms 38 which extend substantially in the displacement direction V of the slider unit 22. The carrier arms 38 have ends 40 spaced maximally apart from one another in the displacement direction V of the slider unit 22, said ends being substantially semicircular in design in the embodiment represented here. The semicircular ends 40 of the carrier arms 38 can therefore be very successfully mechanically coupled to corresponding end sections 42 of the sliding block 24. Through the mechanical coupling of the ends 40 of the carrier arms 38 and also of the tabs 30, 32 to the sliding block 24, a very stable coupling between the sliding block 24 and the carrier member 26 can be achieved. The stiffness in the Z direction of the motor vehicle depicted in the figures, the pretensioning of the sliding block 24 in the Z direction and the pretensioning of the slider unit 22 in the longitudinal vehicle direction can therefore be very successfully set independently of one another. Furthermore, the embodiment of the slider unit 22 is resistant to production tolerances which occur. The carrier arms 38 only absorb forces transversely to the displacement direction V of the slider unit 22 and are therefore able to have a small installation height.

The carrier member 26 is preferably made either wholly or partially of stainless steel. In this way, the outer creasing and the radii of curvature required as a result for the carrier arms 38 can be dispensed with, since the carrier arms 38 only have to absorb forces transversely to the displacement direction V of the slider unit 22.

In a further preferred embodiment the carrier member 26 is made wholly or partially of spring steel. Simple production of the carrier members 26 by means of thermal after-treatment and subsequent surface coating can therefore be achieved, and through the geometric configuration of the carrier arms, for example the semicircular design of the ends 40 of the carrier arms 38, any catching of the carrier arms 38 during production can be avoided.

The invention is not limited to the exemplary embodiments indicated.

Furthermore, it is possible for the features of the different exemplary embodiments to be combined with one another, so that such configurations are covered by the invention.

The invention claimed is:

1. A slider unit for mounting a movable roof member of a vehicle roof, comprising:
   a sliding block, which is designed for displaceable mounting in a vehicle-fixed part of the vehicle roof and which has at least two sliding faces; and
   a carrier member, which is designed for fixed mechanical coupling to the movable roof member of the vehicle roof and for mechanical coupling to the sliding block;
   wherein the carrier member has a first tab and a second tab which are arranged substantially centrally in the carrier member relative to a displacement direction (V) of the slider unit, wherein the first tab is in engagement with a recess in the sliding block to fix the position of the sliding block in relation to the vehicle-fixed part of the vehicle roof, and the second tab is in engagement with the recess of the sliding block and is designed in such a manner that the sliding block is pretensioned in relation to the vehicle-fixed part in the mounted state of the slider unit, and the carrier member has carrier arms with length extending in the displacement direction (V) of the slider unit, which arms are mechanically coupled at their ends to corresponding end sections of the sliding block.

2. The slider unit of claim 1, wherein the tabs are arranged substantially centrally in the sliding block relative to the displacement direction (V) of the slider unit.

3. The slider unit of claim 1, wherein the second tab is configured as a cutout of the first tab.

4. The slider unit of claim 1, wherein the sliding block exhibits fins in the region of the sliding faces.

5. The slider unit of claim 4, wherein the fins are conical or spherical in design.

6. The slider unit of claim 1, wherein the sliding block is formed in one piece.

7. The slider unit of claim 1, wherein the carrier member is formed in one piece.

8. The slider unit of claim 1, wherein the carrier member is made of a material comprising stainless steel.

9. The slider unit of claim 1, wherein the carrier member is made of a material comprising spring steel.

10. A vehicle roof, comprising:
a vehicle-fixed part;
a movable roof member; and
a slider unit of claim 1;
wherein the vehicle-fixed part is configured as a guide rail, in which the slider unit is displaceably mounted such that the movable roof member is displaceable in relation to the guide rail.

11. The vehicle roof of claim 10, wherein the movable roof member is a sliding headliner which is designed either to close a roof opening in a closed position of the sliding headliner or to open it at least partially in further positions.

* * * * *